US012230919B2

(12) United States Patent
Greiner

(10) Patent No.: US 12,230,919 B2
(45) Date of Patent: Feb. 18, 2025

(54) PLUG CONNECTION FOR TRANSMITTING ELECTRICAL ENERGY

(71) Applicant: Amphenol-Tuchel Industrial GmbH, Heilbronn (DE)

(72) Inventor: Manfred Greiner, Steinheim an der Murr (DE)

(73) Assignee: AMPHENOL-TUCHEL ELECTRONICS GMBH, Heilbronn (DE)

( * ) Notice: Subject to any disclaimer, the term of this patent is extended or adjusted under 35 U.S.C. 154(b) by 379 days.

(21) Appl. No.: 17/781,869

(22) PCT Filed: Nov. 25, 2020

(86) PCT No.: PCT/EP2020/083336
§ 371 (c)(1),
(2) Date: Jun. 2, 2022

(87) PCT Pub. No.: WO2021/110505
PCT Pub. Date: Jun. 10, 2021

(65) Prior Publication Data

US 2023/0006396 A1 Jan. 5, 2023

(30) Foreign Application Priority Data

Dec. 4, 2019 (DE) ......................... 102019133037.8

(51) Int. Cl.
*H01R 13/639* (2006.01)
*H01R 13/187* (2006.01)
*H01R 13/635* (2006.01)

(52) U.S. Cl.
CPC ......... *H01R 13/639* (2013.01); *H01R 13/187* (2013.01); *H01R 13/635* (2013.01); *H01R 2201/26* (2013.01)

(58) Field of Classification Search
CPC .. H01R 13/639; H01R 13/187; H01R 13/635; H01R 2201/26; H01R 13/6271; H01R 13/641; H01R 13/04
See application file for complete search history.

(56) References Cited

U.S. PATENT DOCUMENTS 6,872,103 B1 * 3/2005 Flieger .................. H01R 13/18 439/845
2002/0115339 A1 8/2002 Nakamura
(Continued)

FOREIGN PATENT DOCUMENTS

DE 102005016265 A1 12/2007
DE 102008019852 A1 10/2009
(Continued)

OTHER PUBLICATIONS

International Search Report with English Translation for International Application No. PCT/EP2020/083336; International Filing Date: Nov. 25, 2020; Date of Mailing: Feb. 10, 2021; 5 pages.
(Continued)

*Primary Examiner* — Travis S Chambers
(74) *Attorney, Agent, or Firm* — CANTOR COLBURN LLP

(57) ABSTRACT

The invention relates to a plug connection for transmitting electrical energy by releasable contact, said plug connection comprising at least one plug contact pin and at least one contact socket, the at least one contact socket being received in a plug connector housing and the plug connector housing interacting with a slider which is movable relative thereto, so that the plug connection partners are housed in an inserted and secondarily locked contacting position. At least one detent and support geometry is integrated into the plug contact pin and interacts with the plug connector housing, so that the contacting partners are disconnected from one
(Continued)

another when the positions thereof relative to one another are outside the secondary locking position.

15 Claims, 4 Drawing Sheets

(56) References Cited

U.S. PATENT DOCUMENTS

| | | | | |
|---|---|---|---|---|
| 2006/0216983 | A1* | 9/2006 | Langhoff | H01R 13/6272 439/352 |
| 2022/0368065 | A1* | 11/2022 | Wittmann | H01R 13/641 |

FOREIGN PATENT DOCUMENTS

| | | | |
|---|---|---|---|
| DE | 202010003743 | U1 | 8/2010 |
| DE | 102018208111 | A1 | 11/2019 |
| JP | 2006260920 | A | 9/2006 |
| WO | 03047047 | A1 | 6/2003 |

OTHER PUBLICATIONS

Written Opinion with English Translation for International Application No. PCT/EP2020/083336; International Filing Date: Nov. 25, 2020; Date of Mailing: Feb. 10, 2021; 9 pages.

* cited by examiner

PLUG CONNECTION FOR TRANSMITTING ELECTRICAL ENERGY

CROSS REFERENCE TO RELATED APPLICATIONS

This application is a National Stage Application of PCT/EP2020/083336, filed Nov. 25, 2019, which claims the benefit of German Patent Application Serial No. 102019133037.8, filed Dec. 4, 2019, both of which are incorporated by reference in their entirety herein.

FIELD

The disclosure relates to a plug connection for transmitting electrical energy by means of a releasable contacting arrangement, having at least one plug contact pin and at least one contact socket, wherein the at least one contact socket is received in a plug connector housing and the plug connector housing cooperates with a slider which is movable relative thereto, with the result that the plug connector partners are housed in a plugged and secondary-locked contacting position.

BACKGROUND

Plug connections, contacting elements, terminal connectors, plug sleeves etc. in different embodiments and variants are used for contacting or producing releasable electrically conductive connections. In particular but not exclusively in the case of electrical contacting tasks in the higher power range, contact systems have been developed that are based on round contact geometries for receiving a contact pin, plug contact pin, socket pin, male contact pin, mass pin and their starting material consists of a planar contact grid that is brought into the round contact geometry with a hyperbolic twist. These contact systems that have become known as RADSOK systems are characterized by a robust and high density contact production procedure as a result of their considerable contact area with regard to the respective contact pin. As an alternative, in lieu of the hyperbolic twist situation, inwardly oriented lamella geometries are known, whose lamella contact grid is oriented in a radially symmetrical manner.

These contact geometries that are preferably used as high-power contact sockets are known as radial contact sockets or hyperbolic contact sockets, socket contacts.

RADSOK contact systems of the above mentioned type are received into plug connector socket sleeves by way of their in general cylindrical outer contour and realize the further contacting arrangement on the outer side by way of the cylinder surfaces. Contact systems of this construction are usually formed from at least one lamella socket, contact socket, socket contact and at least one plug control pin, socket pin, male contact pin.

The contacting partner of the contact socket is generally a plug contact pin, socket pin, contact pin having a geometry that is plug-compatible with the lamella socket. Since the outer surface of the contact pin is a functional surface with respect to the lamella sleeve, it cannot be housed or cannot be housed directly or received in a housing.

In order to secure the plug connection that consists of a lamella socket and contact pin in its plugged, power-contacting position, different latching devices, positioning facilities, the so-called secondary-locking arrangement are constructed in a non-positive and/or positive locking manner. The same applies for enclosing measures, sealing tasks, corrosion protection and various other requirements that occur depending upon the individual application purpose.

Measures enclosing the plug connection and/or its plug connection partner are frequently used to provide touch protection. For example DE 10 2012 105 771 A1 discloses a plug having a contact socket that endeavours to provide protection against touch and to prevent the penetration of dirt and water. For this purpose, it is proposed to close the insertion opening of the contact socket with a pivotable screen element. The socket contact that is arranged in the contact socket is completely revealed by pivoting the screen element, with the result that the pin contact can be inserted into the socket contact. The protective cover is a pivotably mounted screen element having an allocated spring, with the result that the screen element is held by means of the spring in a closure position in which it closes an insertion opening of the contact socket and by inserting a pin contact against the force of the spring the screen element is pivoted into an insertion position in which the insertion opening is revealed.

The WO 03/047047 A1 proposes a solution for the latching task, which involves different plugging forces for connecting and releasing the plug with respect to the contact socket. A bore hole having a groove is provided in a socket element which is designed as a housing, enclosure of the plug connection, said groove being arranged on an inner surface of the bore hole. The bore hole represents a shoulder between a groove base and a bore hole. A flat spring for defining a spring hollow space between the flat spring and the shoulder and a circular inclined winding is arranged in the groove. A further, helical-shaped or spiral-shaped spring is arranged in the spring hollow space. The contact pin is designed with a conical end in such a manner that it cooperates with the spring combination and can be pushed into and out of the arrangement. During the insertion movement, it is necessary to overcome the force which the helical-shaped spring requires to realize its elastic deformation to reveal the bore hole, during the extraction movement the elements of the flat spring are to deform.

In order to configure the plug connections in such a manner that the contacting arrangement is secure and the plugged connection can be released without using a tool, DE 10 2005 016 265 A1 proposes a plug connection with a plug and a socket, wherein the plug latches with the socket in the plugged state. For this purpose, a latching arrangement is provided on the contour of the plug or the socket. The latching arrangement can be preferably released using a tool and the socket and the plug can subsequently be separated from one another. The latching arrangement is encumbered with the risk of being damaged when subjected to a mechanical loading and in fact especially in conjunction with low temperatures.

The socket element in the form of a lamella socket has a socket body. The socket body has a circular cylindrical plug receiving chamber and a conductor receiving chamber. The plug receiving chamber has an inner plug receiving chamber and an outer plug receiving chamber. The inner plug receiving chamber has a smaller diameter than the outer plug receiving chamber. The outer plug receiving chamber has consequently a greater diameter than the inner plug receiving chamber. A stop is formed at the transition from the outer plug receiving chamber having the larger diameter to the inner plug receiving chamber having the smaller diameter. The stop is realized by reducing the diameter.

Latching means are arranged on the outer contour of the socket body. The latching means are arranged outside on the socket body in the region of the stop that is arranged inside the socket body. The conductor receiving chamber is used to receive a conductor by means of which the socket element can be connected to a current circuit. A latching element is provided adjoining the stop in the outer plug receiving chamber. It is preferred that an intermediate space adjoins the latching element on the side that lies opposite the stop. Adjoining the existing intermediate space, a contact socket is provided in the outer plug receiving chamber. The contact socket ends outwards preferably flush with the socket body. The contact socket is connected in an electrically conductive manner to the socket body of the socket element. As a consequence, an electrically conductive connection is produced from the contact socket to the conductor that is arranged in the conductor receiving chamber.

The contact sleeve is fastened in the outer plug receiving chamber by being pressed therein. The intermediate space is used to compensate any tolerance, with the result that it is ensured that the latching element still has sufficient play when the socket element is assembled. The outer diameter of the latching element is somewhat smaller than the inner diameter of the outer plug receiving chamber.

When the socket element is being assembled, it is possible thereby to introduce the latching element into the outer plug receiving chamber. The socket body is a rotary part having a cylindrical shape and having a cylindrical plug receiving chamber and a cylindrical conductor receiving chamber. The contact socket is a cylindrical RADSOK socket. In this case, individual contact surfaces that lie in the interior of the contact socket form cylindrical surface contact means. The latching element is a disc made from a thermoplastic material, in particular a synthetic material. The latching element can also be produced from a bent wire or also from a suitably slotted metal disc. The latching element has a cut-out in the form of a hole.

The contact pin has a first section having a first diameter. A second section having a second diameter adjoins the first section. The second diameter is smaller than the first diameter. A third section adjoins the second section. Adjoining the second section, the third section has latching means. The third section has towards the second section a diameter which is greater than the first diameter but smaller than or a maximum equal to the first diameter. As the distance from the second section or the latching means increases, the diameter of the third section reduces, in other words the third section is designed in a conical manner. The surface of the first section forms a contact surface of the contact pin.

Many of the known plug connection solutions are optimized and conditioned to one requirement. Most of the solutions have the disadvantage that both plug connection partners must have a housing and as a consequence are complex and cost-intensive. Furthermore, both plug contact partners have complex geometric shapes owing to the functional surfaces of the plug connection both in the contact socket and also in the plug contact pin.

In addition to the above, it should be appreciated for a plug connection that the releasable plug connection only produces or realizes the electrical contacting arrangement in the latched, secured or locked end position. This requirement, function can prevent damage to the electrical components which are to be contacted, arcing or an unreliable contacting arrangement.

SUMMARY

The disclosure discusses embodiments to develop existing plug contact connections, plug connection, plug contact system, contact system and to reduce at least in part the existing disadvantages. In particular, a plug connection is to be created which prevents the plug connection partners making electrical contact prior to realizing the latching position, locking position.

Disclosed is a concept of a single pole electrical plug contact in the form that, when a contact socket, lamella socket, socket contact is being plugged onto a contact pin, plug contact pin, socket pin, male contact pin without a housing or any other surrounding geometries, if the latching (secondary), locking position is not realized, these are released from the male contact pin and an electrical contacting arrangement is not produced or is released. The latching, locking position corresponds frequently but not necessarily to the end position of the plug connection partner. It is recognized that by integrating the latching and support geometries, preferably in the male contact pin and/or integration of the enclosing elements on sides of a preferably spring-loaded contact socket is suitable to prevent the electrical contacting arrangement outside the latching position.

BRIEF DESCRIPTION OF THE DRAWINGS

The invention is further explained below with the aid of an exemplary embodiment, wherein the plug contact pin is configured as a mass connection, in conjunction with the figures. In the drawing.

DETAILED DESCRIPTION

Figure 1:
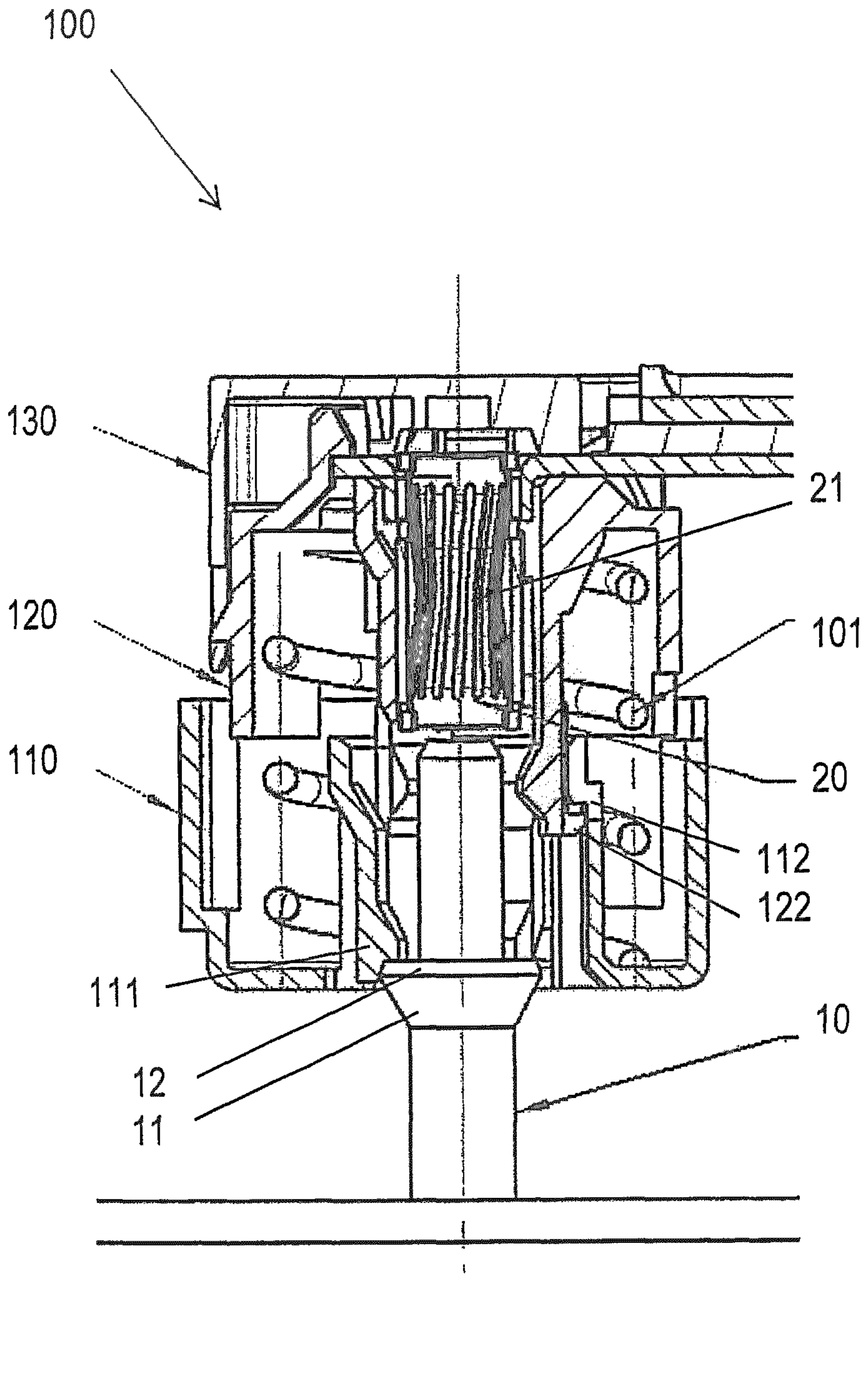
FIG. 1 illustrates a sectional front view of the plug connection having a socket pin, which is designed as a mass connection, and having the contacting partner in the form of a lamella socket in the relative position with respect to one another prior to the plugging process.

FIG. 1 illustrates the sectional front view of the plug connection 100 having a socket pin 10, which is designed as a mass connection, and having the contacting partner in the form of a lamella socket 20 in the relative position with respect to one another prior to the plugging process. The position of male the contact pin 10 flush and perpendicular to the contact socket 20 is the positioning prior to the plugging process, in other words the contact partners are (still) not in engagement. The assembly unit comprising at least the slider 110, the socket housing 120 and the socket contact 20, which is received therein, and the spring 101, is brought into the plugging position by way of the socket pin 10.

The spring 101 is designed as a helical spring, compression spring and accordingly pre-tensioned, with the result that the slider 110 is pushed in the illustrated position into an end position relative to the socket housing 120 and against the stop that is formed from at least one shoulder 112 and at least one protrusion 122.

The slider 110 is supported in this positioning situation in a non-positive locking manner with its at least one support hook 111 against the cone 11 and/or the chamfer 12 of the male contact pin 10, with the result that the assembly unit comprising at least the slider 110, the socket housing 120 and the socket contact 20, which is received therein, and the spring 101, is arranged in the defined position with respect to the socket pin 10. Likewise, the supporting arrangement of the at least one support hook 111 is relevant with regard to the flow of force for compressing the spring 101, since it functions as a counter bearing of the spring 101 with respect to the movement force and the relative movement travel of the housing 120.

The continuation of the electrical contacting arrangement to a voltage source, an electrical consumer or a mass connection, ground connection, can occur by way of a cover 130. For this purpose, the socket housing cover 130 is equipped with contacting means for the lamella contact socket 20 and said contact means comprise at least in sections the outer contour of the lamella contact socket 20.

On the male contact pin side, in other words on the plug side of the plug connection 100, all the latching and supporting geometries 11, 12 are integrated into the male contact pin 10 itself, there is no surrounding additional geometry in the form of a male contact pin housing or similar, in which these functions are accommodated. FIG. 1 illustrates a free-standing mass pin 10 that is welded for example to a vehicle body.

Figure 2:
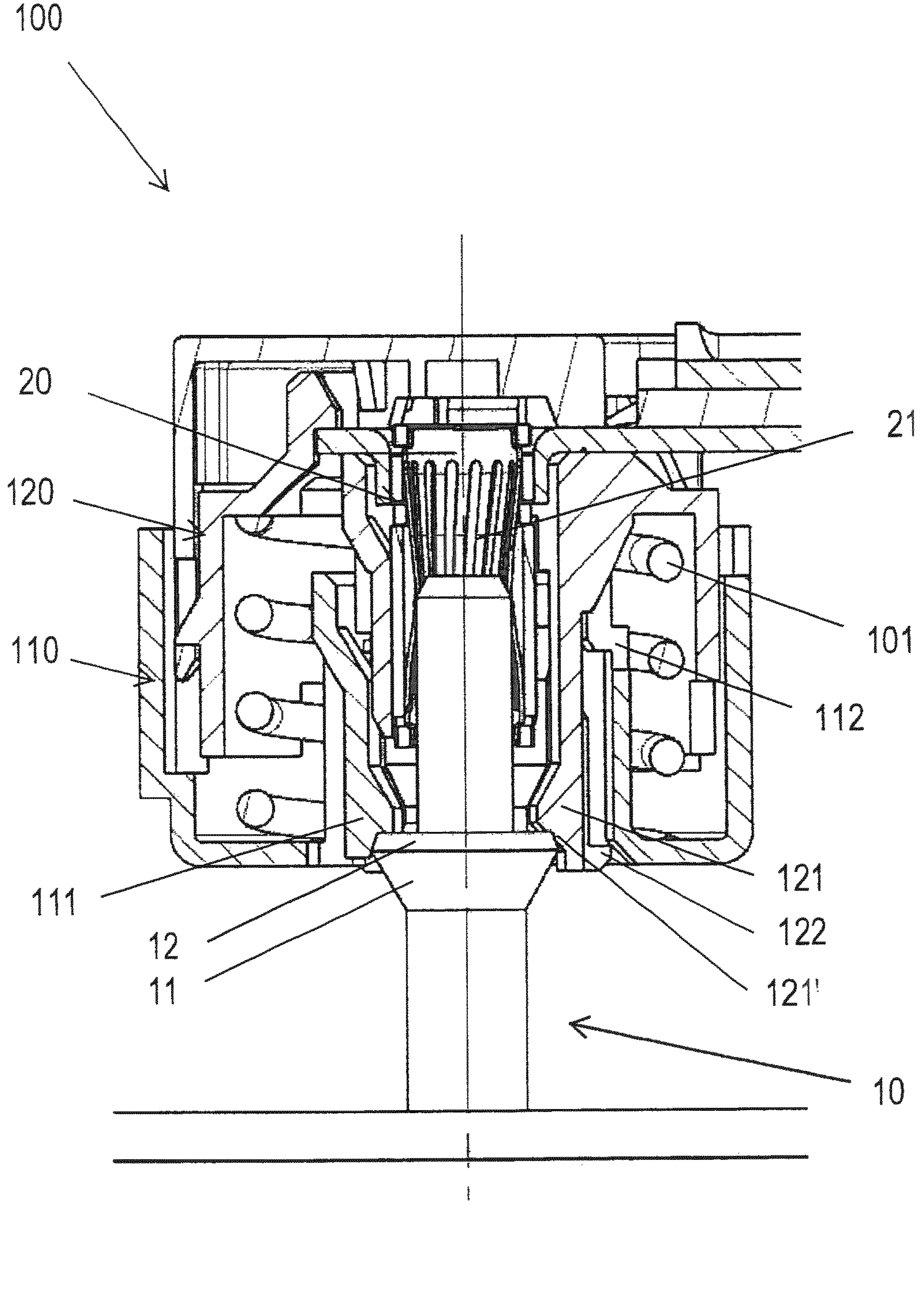
FIG. 2 illustrates the sectional front view of the plug connection having a socket pin, which is designed as a mass connection, and having the contacting partner in the form of a lamella socket in an in part plugged situation.

FIG. 2 comprises the sectional front view of the plug connection 100 having a socket pin 10, which is designed as a mass connection, and having the contacting partner in the form of a lamella socket 20 in an in part plugged situation. The plug connection 100 is plugged in part by virtue of the fact that the plugging travel of the socket pin 10 into the lamella contact sleeve 20 is (still) not fully performed up to its end position in the contact socket 20. It is preferred that the end position is realized after the maximum possible plugging travel and the latching, secondary-locking arrangement is preferably implemented in the end position.

The amount of the in part plugging travel, illustrated in FIG. 2, corresponds to the distance which the socket pin 10 is pushed into the lamella contact socket 20. The slider 110 is pushed with the plugging movement and against the spring force of the spring 101 relative to the housing 120 in an axial manner. The at least one latching hook 121 lies in this plugged situation with a hook incline 121' against the chamfer 12 of the cone 11. The hook incline 121' and the chamfer 12 are coordinated with one another with respect to their inclines in such a manner that the outward deflection of the latching hook 121 is supported during a further plugging travel in the direction of the end position of the socket pin 10 into the lamella contact socket 20. The angle of inclination of the hook incline 121' is sufficiently small with regard to the axial line with the result that the inclined surface is reliably prevented from becoming jammed against the chamfer 12. Usually and depending upon the surface finish, smoothness of the surfaces that move relative to one another, an angle of inclination less than 45° is possible.

If the plugging procedure is interrupted, for example in the situation illustrated in FIG. 2, by virtue of the fact that the outer plugging force for overcoming further compression of the spring 101 is no longer exerted against its already realized spring pre-tensioning, the result is that the plug connection and the contacting situation is terminated. As a result of the stored spring force, realized pre-tensioning and by way of the force flow support of the at least one support hook 111 at the chamfer 12 of the cone 11, the spring 101 pushes the housing 120 having the lamella socket 20 in the axial direction out of the contacting position.

Figure 3:
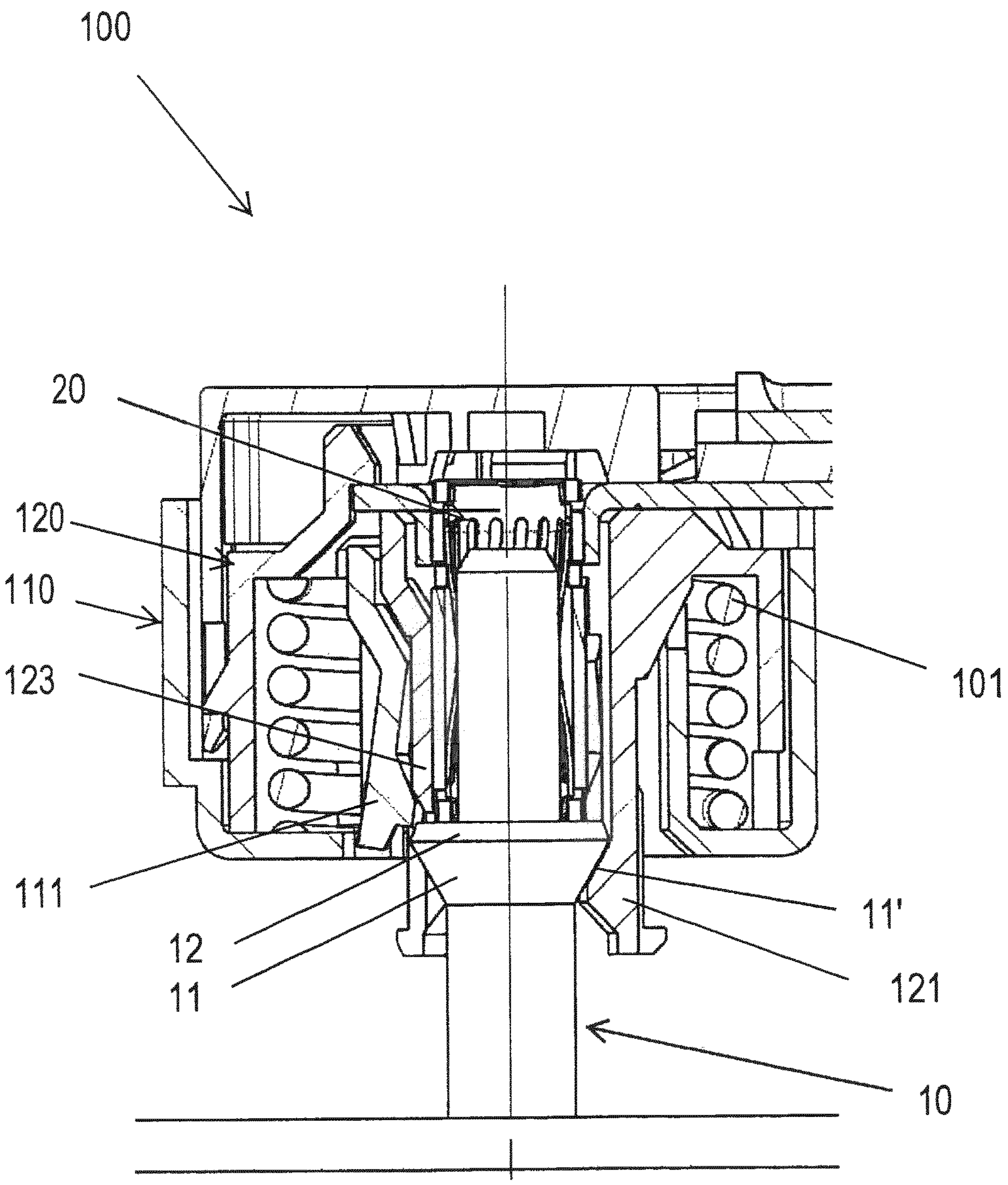
FIG. 3 illustrates the sectional front view of the plug connection having a socket pin, which is designed as a mass connection, and having the contacting partner in the form of a lamella socket in the plugged situation.

FIG. 3 illustrates the sectional front view of the plug connection 100 with the socket pin 10 and the contacting partner in the form of a lamella socket 20 in the plugged situation in the end position. In this case, the contact pin 10 is pushed into the contact socket 20 by the maximum possible insertion travel. The spring 101 is pushed in as far as to close to the block, the housing 120 is moved a maximum into the slider 110 and lies at the end face against the slider base.

The at least one support hook 111 of the slider 110 is located in an in part outward deflected situation which is brought about by means of the inner sleeve 123 of the housing 120 in dependence upon the insertion travel of the socket pin 10 into the lamella socket 20. The support hook 111 is included in the illustrated outward deflected situation (still) in the function of the counter bearing for the spring 101 and holds the slider 110 in the position in which, as far as geometrically possible, it receives the housing 120.

The latching function, in other words the secondary-locking of the plug connection 100, is realized in accordance with this exemplary embodiment in the end position and as a result brings about that the latching hook 121 engages, viewed in the plugging direction, behind the cone 11 against its conical surface 11' and holds the housing 120 in a releasable non-positive locking manner.

Figure 4:
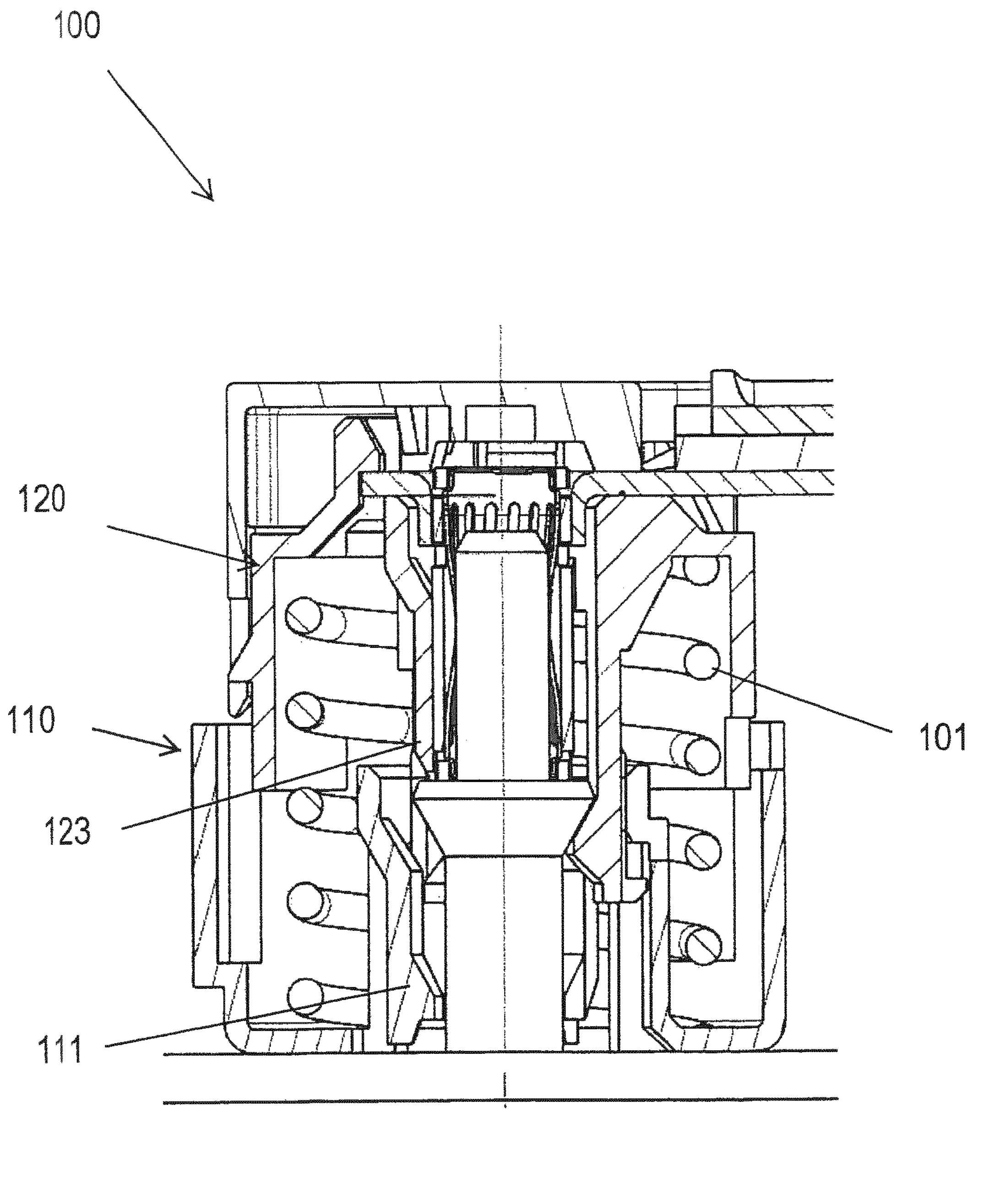
FIG. 4 illustrates the sectional front view of the plug connection having a socket pin, which is designed as a mass connection, and having the contacting partner in the form of a lamella socket in a plugged and latched, secondary-locked situation.

FIG. 4 illustrates the sectional front view of the plug connection 100 having a socket pin 10 that is designed as a mass connection and having the contacting partner in the form of a lamella socket 20 in a plugged and latched, secondary-locked situation. With the outward deflection of the at least one support hook 111 out of its supporting position at and against the cone 11 and/or the chamfer 12 of the contact pin 10 and as a result thereof out of its counter bearing function, the slider 110 is pushed by means of the pre-tensioned spring 101 in an axial manner and relative to the housing 120, with the result that the part of the socket pin 10 which has hitherto still been exposed is covered by means of the housing. It is preferred that the slider end position is defined by means of a stop, the stop is illustrated on a vehicle body part. A stop is also possible on the housing 120 of the plug connection.

The spring residual pre-tensioning and the length relationship of the housing 120 and the slider 110 in the axial direction are coordinated with one another in such a manner that the tensioning of the plug contact system 100 is low in the secondary-locked end position.

The invention claimed is:

1. A plug connection assembly for transmitting electrical energy by means of a releasable contacting arrangement, having at least one plug contact pin and at least one contact socket, wherein the at least one contact socket is received in a plug connector housing and the plug connector housing cooperates with a slider which is movable relative thereto in response to a spring force, with the result that the at least one plug contact pin and the at least one contact socket are housed in a plugged and secondary-locked contacting position, wherein at least one latching and support geometry is integrated in the plug contact pin and cooperates with the plug connector housing with the result that the contacting partners are separated from one another if their relative position with respect to one another is outside the secondary-locking position.

2. The plug connection assembly for transmitting electrical energy as claimed in claim 1, wherein the cooperation of the at least one support geometry with the plug connector housing is performed by at least one latching hook.

3. The plug connection assembly for transmitting electrical energy as claimed in claim 2, wherein the at least one latching hook is a component of the plug connector housing.

4. The plug connection assembly for transmitting electrical energy as claimed in claim 2, wherein the at least one latching hook having the at least one support geometry is designed as a cone and realizes a releasable, at least non-positive latching arrangement, to provide a secondary-locking arrangement.

5. The plug connection assembly for transmitting electrical energy as claimed in claim 1, wherein the at least one latching and support geometry cooperates with at least one support hook of the slider, with the result that the slider is pushed in at least in part into the plug connector housing during the insertion movement of the at least one plug contact pin into the contact socket.

6. The plug connection assembly for transmitting electrical energy as claimed in claim 5, wherein the at least one support hook is outward deflected by means of at least one inner sleeve in the secondary-locking position of the contacting partners, with the result that the slider is movable out of the plug connector housing in the direction of the enclosing position.

7. The plug connection assembly for transmitting electrical energy as claimed in claim 6, wherein the movement of the slider out of the plug connector housing is limited by means of a stop, formed by at least one shoulder and at least one protrusion.

8. The plug connection assembly for transmitting electrical energy as claimed in claim 6, wherein the force for moving the slider is a spring force.

9. The plug connection assembly for transmitting electrical energy as claimed in claim 1, wherein the force for separating the contacting partner is a spring force.

10. The plug connection assembly for transmitting electrical energy as claimed in claim 8, wherein the spring force is brought about by means of a spring that is a compression or helical spring.

11. The plug connection assembly for transmitting electrical energy as claimed in claim 10, wherein the spring is arranged at least in part in the housing and/or in the slider of the plug connection.

12. The plug connection assembly for transmitting electrical energy as claimed in claim 1, wherein the plug contact pin is a mass pin, fixed by welding to a vehicle body.

13. The plug connection assembly for transmitting electrical energy as claimed in claim 1, wherein the plug connector housing has a socket housing cover having contacting means for electrically contacting the contact socket.

14. The plug connection assembly for transmitting electrical energy as claimed in claim 1, wherein the contact socket is a lamella contact socket.

15. The plug connection assembly for transmitting electrical energy as claimed in claim 1, wherein the secondary-locking contacting position of the plug connection partners is an end position of the plug connection at the end of the plugging movement.

* * * * *